June 30, 1964 F. SPANDÖCK 3,139,151

METHOD AND APPARATUS FOR DETERMINING ACOUSTIC EFFECTS

Filed Sept. 8, 1959 8 Sheets-Sheet 1

*Inventor*

*FRIEDRICH SPANDOCK*

*By Toulmin & Toulmin*

*Attorneys*

Inventor
FRIEDRICH SPANDOCK
By Toulmin & Toulmin
Attorneys

June 30, 1964 F. SPANDÖCK 3,139,151

METHOD AND APPARATUS FOR DETERMINING ACOUSTIC EFFECTS

Filed Sept. 8, 1959 8 Sheets-Sheet 3

Inventor
FRIEDRICH SPANDOCK

By Toulmin & Toulmin
Attorneys

June 30, 1964 F. SPANDÖCK 3,139,151

METHOD AND APPARATUS FOR DETERMINING ACOUSTIC EFFECTS

Filed Sept. 8, 1959 8 Sheets-Sheet 4

*Inventor*

*FRIEDRICH SPANDOCK*

*By Toulmin & Toulmin*

*Attorneys*

June 30, 1964 F. SPANDÖCK 3,139,151

METHOD AND APPARATUS FOR DETERMINING ACOUSTIC EFFECTS

Filed Sept. 8, 1959 8 Sheets-Sheet 5

Inventor
FRIEDRICH SPANDOCK
By Toulmin & Toulmin
Attorneys

Inventor
FRIEDRICH SPANDOCK
By Toulmin & Toulmin
Attorneys

METHOD AND APPARATUS FOR DETERMINING ACOUSTIC EFFECTS

Filed Sept. 8, 1959 8 Sheets-Sheet 7

Inventor
FRIEDRICH SPANDOCK

By Toulmin & Toulmin
Attorneys

Inventor
FRIEDRICH SPANDOCK
By Toulmin & Toulmin
Attorneys

United States Patent Office 3,139,151
Patented June 30, 1964

3,139,151

METHOD AND APPARATUS FOR DETERMINING ACOUSTIC EFFECTS

Friedrich Spandöck, Arcisstrasse 36, Munich, Germany
Filed Sept. 8, 1959, Ser. No. 838,448
Claims priority, application Germany Jan. 5, 1959
7 Claims. (Cl. 181—30)

The present invention relates to a method and an apparatus for testing the acoustic qualities of rooms such as concert halls and the like, even prior to their construction.

For rooms used for acoustic reproduction or original reproduction such as concert halls and the like particular acoustic qualities must be obtained. Heretofore it has not been possible to determine the acoustic qualities of a room prior to its construction. The known methods using statistic or geometric approximation or based on wave theory have proved to be unsatisfactory. As a consequence, it has often become necessary to reconstruct rooms such as concert halls in order to improve their acoustic qualities. In the course of the construction of the Royal Festival Hall in London, for example, it was necessary to change its structure repeatedly in order to correct its acoustic characteristics which it was impossible to determine prior to its construction. Moreover, acoustic characteristics used in conventional methods as, for example, reverberation time, definition, or diffusiveness of sound energy are rather difficult concepts which are frequently incomprehensible to architects, musicians and even experts. In particular, even experts do not agree which combination of these determinant factors results in the optimal acoustic quality of a particular structure. It would be much easier if the sound pattern can be judged directly by the human ear.

It is, therefore, an object of the present invention to provide an improved method and apparatus for determining the acoustic effects of a room prior to its construction.

It is another object of the present invention to provide an improved method and apparatus for determining the acoustic quality of a room prior to its construction by means of a model reverberation chamber which is comparatively simple and inexpensive.

It is a further object of the present invention to provide an improved method and apparatus for determining the acoustic quality of a room prior to its construction by means of a model reverberation chamber which makes it possible to judge the acoustic quality directly with the human ear.

These objects are achieved by the method and apparatus for determining and testing the acoustic effects of a room according to which the sound effects are observed in a model reverberation chamber which is reduced in size as compared with the original room by a factor $n$ which is in the range of from 7 to 14, and wherein air is used as a gas medium which is dried so as to have a degree of relative humidity below 10%. The invention further comprises a number of improvements described further below.

The invention will be better understood upon the description of the accompanying drawings, wherein—

Figure 10A:
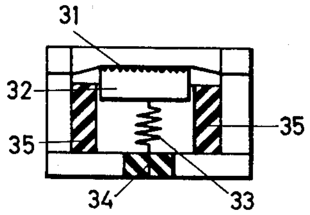
Figure 10B:
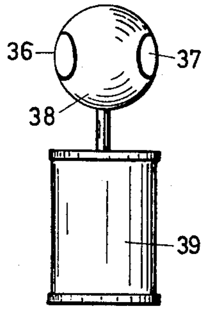
Figure 11:
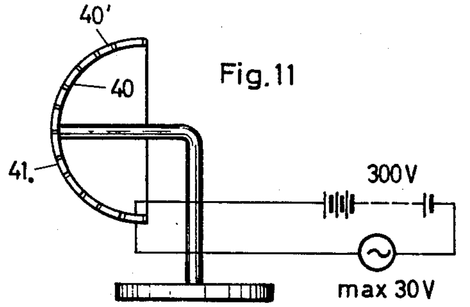
Figure 11A:
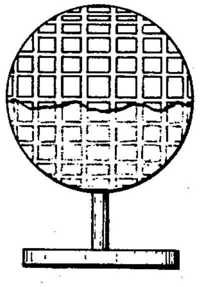
Figure 12A:
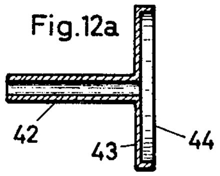
Figures 12B, 12C:
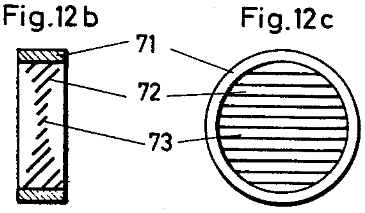
Figure 13:
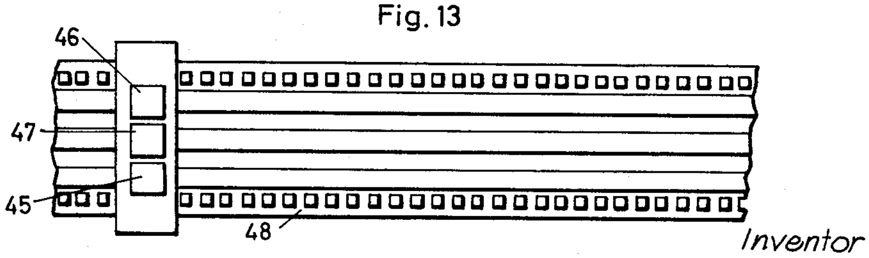
Figure 14:
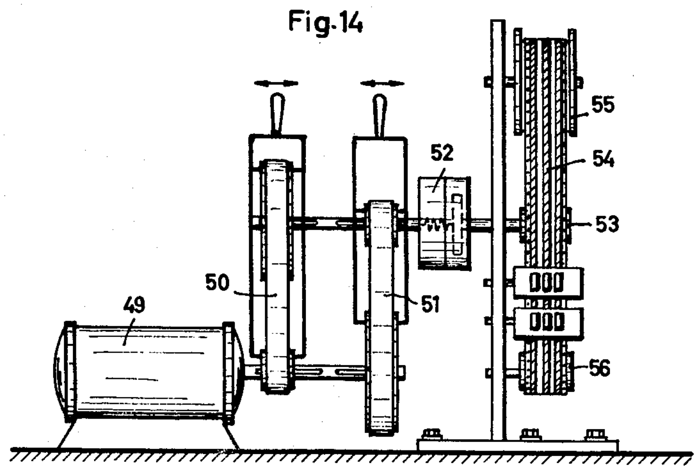
Figure 15:
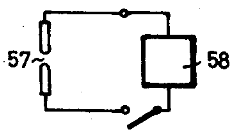
Figure 16:
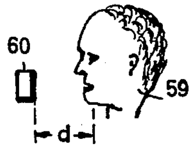
Figure 17:
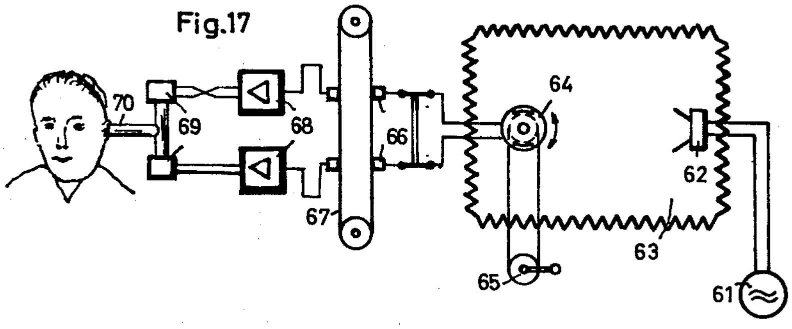

FIGURE 10*a* is a sectional view of an electrostatic small microphone for use in the chamber;

FIGURE 10*b* is a perspective view of a stereophonic small microphone comprising two microphones disposed in a manner similar to the human ears;

FIGURE 11 is a side view, partly in section, of an electrostatic high frequency loud-speaker for use in the model;

FIGURE 11*a* is an end view of the loud speaker shown in FIGURE 11;

FIGURE 12*a* is a sectional view of a search tube for use in the model;

FIGURE 12*b* is a sectional view of an acoustic lens of the loud-speaker in the model;

FIGURE 12*c* is a front view of an acoustic lens of the loud speaker in the model;

FIGURE 13 is a top view of a magnetic recording arrangement with several tracks and a perforated film strip;

FIGURE 14 is a side elevational view of a device for changing the number of revolutions and thus the running speed of the magnetic tape or film device for scaling up the frequency in the same proportion as the linear dimensions of the model are reduced compared with the original room;

FIGURE 15 is a diagram illustrating an electric spark sound source for measuring the reverberation in the model;

FIGURE 16 shows a speaker with a microphone and illustrates the distance between the speaker and the microphone as being smaller than the reverberation radius;

FIGURE 17 is a diagram of a stereophonic measuring arrangement with balancing means for the stereo-channels for use with the apparatus of the invention.

Figure 1:
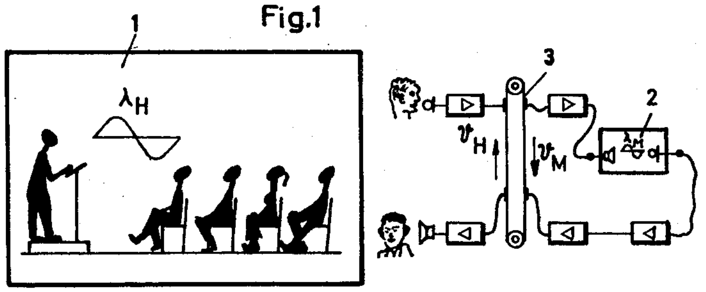
FIGURE 1 is a diagram of the system of the present invention.
Figure 5:
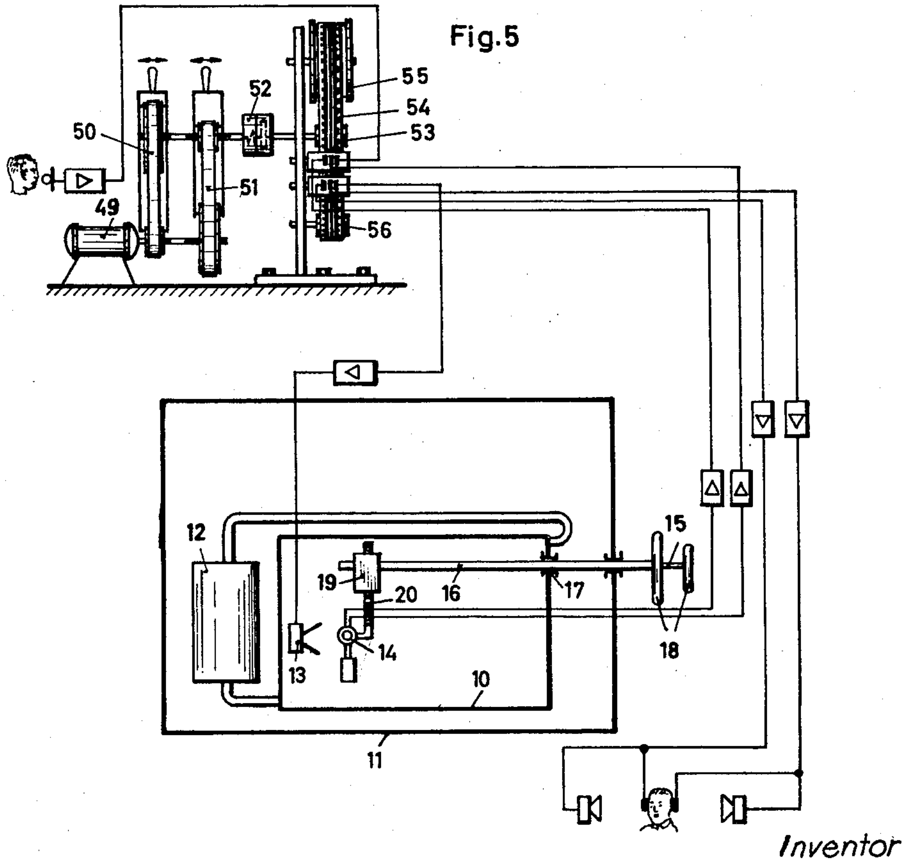
FIGURE 5 is a somewhat schematic view of the apparatus of the present invention.

Referring to the drawings more in detail and turning first to FIGURE 1, the acoustic effects and qualities of an original room are to be examined having the length $l$, the length of sound waves "being $\lambda_O$, the index O referring to the 'original room.'" In order to determine the acoustic qualities of this original room prior to its construction, a model 2 of the room is prepared on a reduced scale, the reduction factor being designated by $n$; the model having a length $l_M$, the length of the sound waves being $\lambda_M$, the index M referring to the model room. After preparation of this model 2 having $1/n$ of the dimensions of the original room as planned by the architect, a sound recording is reproduced in the model room, which recording is reproduced e.g. by a sound carrier 3 having the $n$-fold speed of normal reproduction. The speed of the sound carrier is determined by the equation $V_M = nV_O$, V designating the speed of the sound carrier in meters per second, the indices M and O referring to the model and the original room, respectively. Thereby, the same effects of reflection and diffraction and an analogous field of sound are obtained in the model having $1/n$ of the original room, as in the original room itself.

The frequency of sound emitted in the model can very well be increased up to and including the ultra sonic frequency range. The sound including all acoustic effects accompanied by the emission of the sound in the model room are recorded; attention is paid to the necessity of having gases in the model room 2 whose speed of sound characteristic is identical to that in the original room 1. The recording is done by a sound carrier having the same elevated speed as the sound carrier for reproducing sound at *n*-fold frequency in the model, i.e. it has the speed $V_M = nV_O$. Thereupon, the thus recorded sound is reproduced at normal frequencies; this is done by a magnetic reproducing unit running at *n*-fold reduced speed compared with the recording unit, i.e. it has the speed $$V_n = \frac{V_M}{n}$$

Thereby all sounds, e.g. spoken language, music, test sounds and the like are reproduced at the normal pitch and in regular time sequence, accompanied, however, by the sound effects produced in the model 2. These accompanying sound effects are fully representative of the sound effects accompanying the reproduction of sound in the original room. It is thus possible to objectively measure the effects of sound reproduction in a predetermined room although it has not yet been built, so as to allow for necessary improvements in the structure thereof to give better and more agreeable audibility. It is also possible to get a direct impression of the sound effects and the audibility by listening to the reproduced sound as previously recorded in the model room.

I have now discovered, when carrying out the aforementioned steps the following conditions must be observed according to the method of the invention:

In constructing the model care must be taken that all geometric dimensions are reduced linearly by the *n*-fold; the factor of the dimensional reduction is thus $$n = \frac{l_O}{l_M}.$$

Secondly, all time values T must be shortened by the $$n \cdot \frac{c_M}{c_O}$$

fold, *c* representing the speed of sound coefficient of the gas within the model room M. A time ratio must be established following the ratio $$\frac{T_O}{T_M} = n\frac{c_M}{c_O}$$

This means that all frequencies *f* in the model must be increased by the $$n \cdot \frac{c_M}{c_O}$$

fold, so as to obtain $$\frac{f_M}{f_O} = n\frac{c_M}{c_O}$$

Since $$\frac{\lambda_O}{\lambda_M} = \frac{l_O}{l_M} = n$$

all effects of diffraction and directivity patterns in the model and in the original must be identical. This identity is accomplished by increasing the speed *v* of the sound carrier in the model by $$n \cdot \frac{c_M}{c_O}$$

so as to obtain $$\frac{v_M}{v_O} = n\frac{c_M}{c_O}$$

Thirdly, the degrees of absorption of sound α of the walls in the original and the model are made identical with equivalent frequencies, i.e.

$$\alpha_O = \alpha_M$$

This effect can be accomplished by reducing the sound absorbing elements in the model by the *n*-fold and increasing to the *n*-fold the flow resistivity of these absorbing elements (Ξ representing hereinafter the specific flow resistivity taken in longitudinal direction and; expressed in microbar/second per square centimeter).

According to the invention this can also be done by empirically balancing the absorbing values of the sound absorbing elements as described in greater detail further below.

Fourthly, the absorption of sound of the gaseous medium *m* in the model must be increased by the $$n \cdot \frac{c_M}{c_O}$$

fold, corresponding to the smaller distances covered in the model, i.e.

$$\frac{m_M}{m_O} = n\frac{c_M}{c_O}$$

This can be effected by drying the air as described in the present invention.

Fifth, the power P of the sound producing sources can be reduced by the $n^2$ fold in the model, according to $$\frac{P_M}{P_O} = \frac{1}{n^2}$$

However, inasmuch as linear conditions prevail, the aforementioned factor can be disregarded in the presence of adjustable amplification and provided the amplitude range is sufficiently maintained. I have also solved this problem, as described further below.

Sixth, I have found that it is particularly useful and impressive, to obtain a direct sensation of the audibility as produced in the model and as representative for the audibility in the predetermined, although physically nonexistent original. In order to obtain in the model the same acoustical impression as in the original room it becomes necessary to provide means for transmitting the preferably stereophonic listening impressions to the human ear by ear-phones or loudspeakers. I have found that a number of problems arise in this connection, which I have also solved by the present invention.

I have solved the aforementioned problems by the method and the apparatus of my invention which I shall now proceed to describe in detail.

Turning first to the method of testing the audibility of predetermined rooms with the aid of a model on a reduced scale, I have found the optimal reduction factor *n*, that is the factor determining the degree of dimensional reduction of the model or against the original, to be in the range of from 7 to 14, the scale thus being in the range of the ratio of from 7 up to and including 14.

The following considerations will explain the logic behind this conclusion. If a greater scale is used, e.g. a scale of 1:5, with *n* equal to 5, the original of a great concert hall will have to be reproduced as a reduced model attaining the dimensions of a small house, and consequently the expenses for constructing the model are prohibitive. If, however, the scale is in the order of 1:10, the dimensions of the model will be those of a conventional living room. The building costs for erecting this model can be assumed to be not more than one eighth of the building costs of the original concert hall as planned.

If, on the other hand, the scale is made too small, e.g. 1:20, the model will have the dimensions of a small box. In this case, the dampening effect of the air will prevent a sound pattern of sufficient fidelity. In addition the recording and reproducing apparatus must operate at and therefore must be adapted for very high frequencies, which would render the broad-band acoustic transducers very insensitive and would make the amplitude range very small.

I have also discovered that the scale of dimensional reduction of the model is limited by the dampening effect of gases at high frequencies, as the inevitable absorption of the walls becomes of minor importance.

I have thus found that the scale of reduction factor of the model is to be chosen from the range of from 7 up to and including 14. Furthermore, I have found, that the optimal scale of reduction factor $n$ can be determined in each individual case by the formula $$m_M \leqq n\frac{(0.04x)}{T_O}+m_O$$

wherein $m_M$ is the admissible exponent of attenuation of sound of the gas medium in the model in Nepers per meter with model frequencies $f_M=nf_O$; $m_O$ is the exponent of attenuation of sound in Nepers per meter of air in the original with the frequencies $f_O$; $T_O$ is the reverberation time of the original; $x \cdot 100$ is the error, expressed percentagewise, between the equivalent reverberation times of the original and the model. It will be seen from this formula that with an error of $x=0$ the admissible attenuation exponent in the model, ($m_M$), can be $n$ times greater than the attenuation exponent in the original, ($m_O$). This last-mentioned condition cannot be obtained if the model is filled with air having an average degree of humidity, due to the strong dampening effect. It has therefore been tried to use air having a maximum degree of humidity (100%) as the gas medium in the model. This would, however, necessitate comparatively big models, if a satisfactory fidelity of the sound effects is to be achieved. I have thus found that it is of far greater advantage to dry the air, preferably to a degree of relatively humidity below 10%.

It was found that the exponent of sound attenuation of gas is $$m_{\text{actual value}}=m_c+m_m$$

wherein the classical absorption caused by inner friction and heat conduction is $$m_c=c'f^2$$

and wherein the molecular absorption caused by the excitation of molecular oscillations is $$m_m=\frac{\dfrac{Mf}{k+2\pi f}}{2\pi fk}$$

Furthermore, $$c'=\frac{2a\alpha}{f_M 2}$$

in Nepers per sec.$^2$ per meter;

$$\alpha=\frac{m}{2}$$

(in Nepers per meter) is the sound absorption constant of the gas. This latter is, following the formulas of Stokes and Kirchhoff, reversed proportional to the atmospheric pressure $p_a$. With air having $p_a=1$ atmosphere and a temperature of $t°$ centigrade, $c'=(33+0.2t)\ 10^{-12}$ (in Nepers sec.$^2$ per meter). Furthermore, $f$ is the frequency in Hertz, $M=2 \cdot 10^{-7}t+8.3 \cdot 10^{-6}$ sec. per meter, and $k=1.92^{1.3} \cdot 10^5$ per second, wherein the humidity is $$h=100\frac{\text{steam pressure}}{\text{barometric pressure}}$$

and is a dimensionless figure.

In view of the fact that the exponents of attenuation of most gases are not much smaller than the exponent of attenuation of air, and since the use of other gases is more expensive, cumbersome and in many instances more dangerous, it is preferable to use air as the gas medium.

Figure 2:
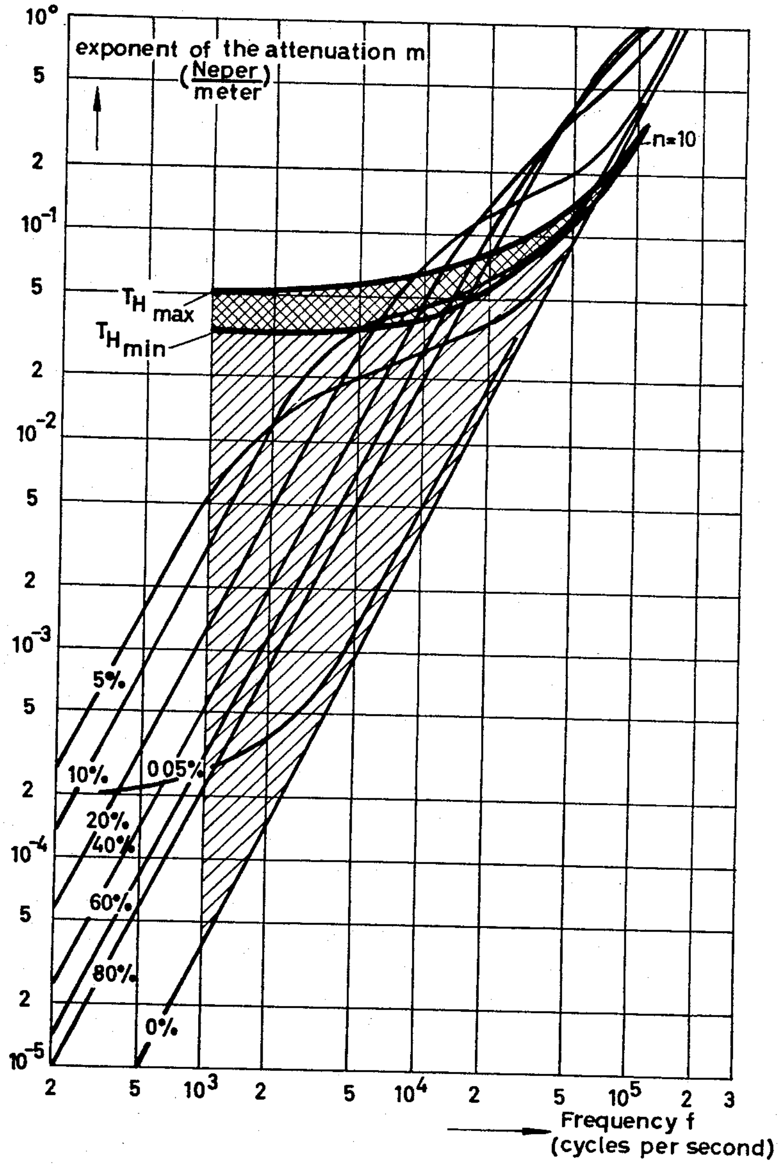
FIGURE 2 is a diagram showing the curves of the exponents of sound attenuation with varying degrees of relative humidity of the air in the model reverberation chamber and depending on the frequency.

According to my invention, the air is dried to a degree of relative humidity of less than 10%. This is explained by FIGURE 2 showing the curves of the actual exponent of attenuation of sound with various degrees of humidity, $m_{\text{actual value}}$, and the admissible exponent of attenuation of air, $m_{\text{desired value}}$, the latter being computed with an error of 20% ($x=0.2$), the reverberation times being $T_O=2.6$ and 1.0 seconds, which latter values are obtained in the best of known concert halls; $n$ is assumed to be equal to 10. With reference to FIGURE 2, the air is dried until the curve for its exponent of attenuation is situated in the range of model frequencies indicated by the crossed lined area in FIGURE 2, between the values $m_O=nm_O$ with an error $x=0$, and $m_{\text{desired value}}$ with an error $x=0.2$. This is the case at predetermined relative humidity which I have found to be below 10%.

The scale of reduction of the model as compared with the original can also be determined by the formula:

$$n=\frac{\dfrac{0.04x}{T_O}+C'f_O{}^2+\sqrt{\dfrac{0.04x}{(T_O+C'f_O{}^2)^2}4c'f_O{}^2\dfrac{Mk_M}{2\pi}}}{2c'f_O{}^2}$$

(For the definition of C′ see column 7, line 45.)

wherein $f_O$ is the upper marginal frequency in Hertz limiting the frequency range within which a sound pattern of sufficient fidelity can be obtained in a model.

The following calculations will explain how the above formula is arrived at:

According to the first condition explained supra, on linear dimensions $$V_O=n^3V_M \quad \text{(I}a\text{)}$$

$$S_O=n^2S_M \quad \text{(I}b\text{)}$$

$S_O$ being the area of any original surface, and $S_M$ being the corresponding area in the model.

According to the second condition explained supra, on the frequency scale $$n=\frac{f_M}{f_O} \quad \text{(II)}$$

According to the third condition, explained supra, on the equality of equivalents $$\alpha_O=\alpha_M=\alpha \quad \text{(III)}$$

The deviation of accuracy of reverberation with an error $x$ $$T_O=n(1+x)T_M \quad \text{(IV)}$$

It is known from Sabine that the reverberation is, considering the air dampening effect $$T_O=\frac{0.6V_O}{\sum \alpha_O S_O+4m_O V_O} \quad \text{(V}a\text{)}$$

$$T_M=\frac{0.6V_M}{\sum \alpha_M S_M+4m_M V_M} \quad \text{(V}b\text{)}$$

The recently discovered approximate values for air absorption are $$m_O \approx C'f_O{}^2 \quad \text{(VI}a\text{)}$$

$$m_M \approx c'f_M{}^2+\frac{Mk_M}{2\pi} \quad \text{(VI}b\text{)}$$

We now obtain from Equation IV $$\frac{1}{T_M}=\frac{n}{T_O}+\frac{nx}{T_O} \quad (1)$$

With this formula, we combine Equations V$a$ and V$b$:

$$\frac{\sum \alpha_M S_M+m_M V_M}{0.16V_M}=n\frac{\sum \alpha_O S_O+4m_O V_O}{0.16V_O}+\frac{nx}{T_O} \quad (2)$$

With this formula we combine Equations I$a$ and I$b$, we multiply with 0.16 and shorten by $V_M$:

$$\frac{\sum \alpha_M S_M}{V_M}+4m_M=n\left(\frac{\sum \alpha_O n^2 S_M}{n^3 V_M}+4m_O n^3\right)+\frac{nx0.16}{T_O} \qquad (3)$$

With this formula we combine Equation III, shorten the potentials of $n$ and isolate $m_M$, and thus obtain:

$$m_M=\frac{1}{4}\left[\frac{\sum \alpha S_M}{V_M}-\frac{\sum \alpha S_M}{V_M}+4nm_O+\frac{0.16nx}{T_O}\right] \qquad (4)$$

where from we obtain:

$$m_M=n\left(m_O+\frac{0.04x}{T_O}\right) \qquad (5)$$

and thus get the aforementioned result:

$$m_{M_{\text{desired value}}}\leqq\left(m_O+\frac{0.04x}{T_O}\right)n \qquad (6)$$

If we now combine the Equations VI$a$ and VI$b$ with Formula 5, we obtain:

$$c'f_M^2+\frac{Mk_M}{2\pi}=n\left(C'f_O^2+\frac{0.04x}{T_O}\right) \qquad (7)$$

According to Equation II we replace $f_M$ by $nf_O$:

$$c'f_O^2n^2-\left(C'f_O^2+\frac{0.04x}{T_O}\right)n+\frac{Mk_M}{2\pi}=0 \qquad (8)$$

wherefrom we obtain the final result $$n=\frac{\frac{0.04x}{T_O}+C'f_O^2\pm\sqrt{\left(\frac{0.04x}{T_O}+C'f_O^2\right)^2-4c'f_O^2\frac{Mk_M}{2\pi}}}{2c'f_O^2} \qquad (9)$$

This formula is based on my discovery that with frequencies below 10 kilocycles and elevated humidity it is possible to disregard in the equation $$m_{\text{actual value}}=m_c+m_m$$

the factor $2\pi f/k$ as against $k/2\pi f$; and that with lower humidity and above 5 kilocycles it is possible to disregard $k/2\pi f$ as against $2\pi f/k$. If that is done, we obtain $m_O=C'f_O^2$, wherein $$C'=\frac{2\pi M}{k} \text{ seconds}^2 \text{ per meter}$$

and $$m_M=c'f_M^2+\frac{Mk_M}{2\pi} \text{ in Nepers per meter}$$

Figure 3:
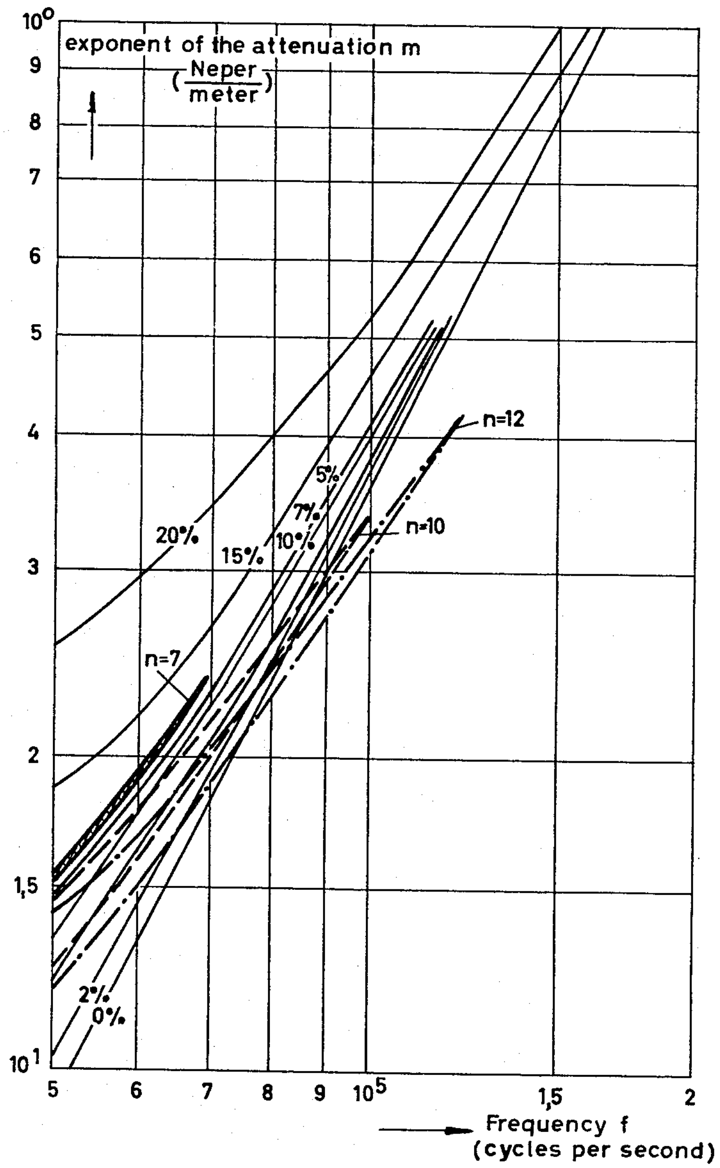
FIGURE 3 is a diagram showing the curves for the factors of FIGURE 3 and constituting an enlarged portion of FIGURE 2 in the frequency range between 50 and 250 kilocycles.

It will be seen from the formula, that the scale grows with error $x$, decreasing marginal frequency $f_O$ and reverberation time $T_O$. FIGURE 3 is a five-fold enlarged section of the diagram of FIGURE 2 for higher frequencies, indicating values for $m_{\text{desired value}}$ with scale reduction factors of $n=12$; $n=10$; and $n=7$, respectively. The marginal frequencies $nf_O$ define the range within which a sound pattern of sufficient fidelity can be obtained in the model, with an error of $x=0.2$. These marginal frequencies are determined by the rule that the corresponding humidity curves $m_{\text{actual value}}$ should be positioned further below, i.e. where curve $m_{\text{desired value}}$ crosses curve $m_{\text{actual value}}$.

Figure 4:
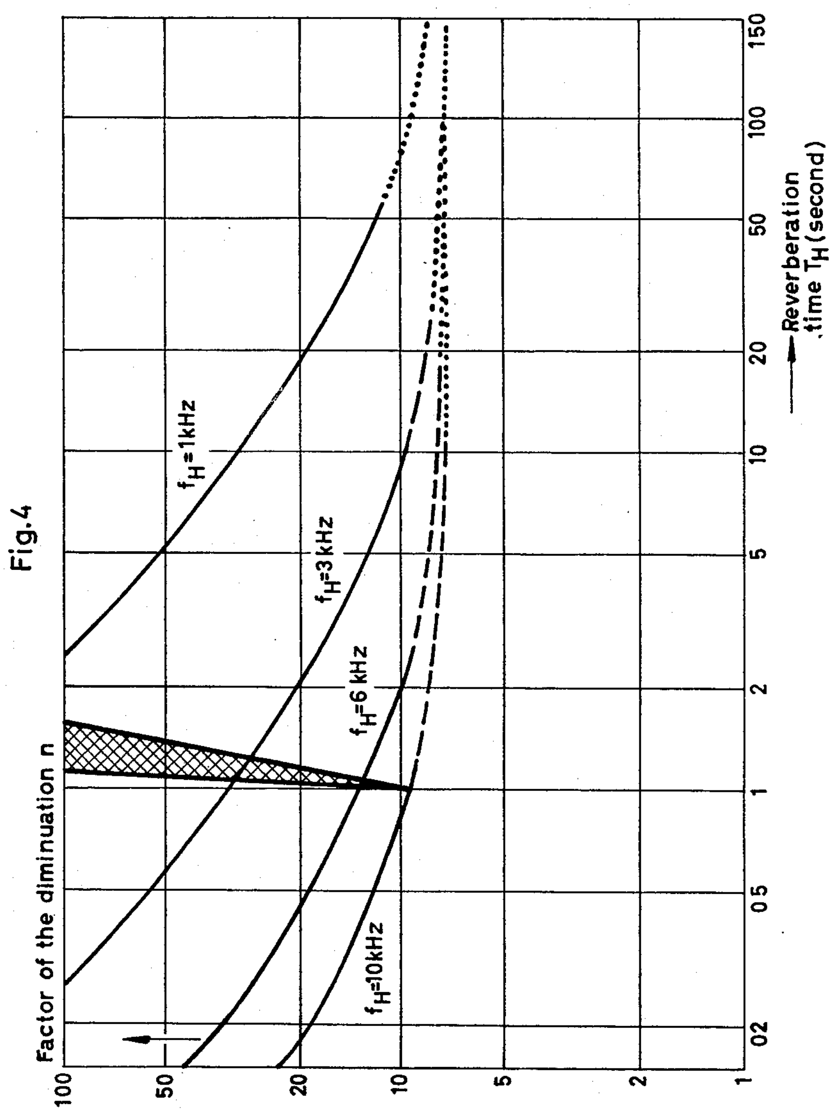
FIGURE 4 is a diagram showing the curves of the scale reduction factors as depending on the reverberation time with various marginal frequencies.

FIGURE 4 shows the reduction factors $n$ as depending on the reverberation time $T_O$ with an error of $x=0.2$. The marginal frequencies $f_O$ are the parameters. The curves are to be considered only in the area having full lines, whereas the values represented by the dashed lines cannot be attained by the reverberation due to the dampening effect of the air. In the area represented by the dotted lines the reverberation is determined by the inevitable absorption. The area corresponding to values obtained in fully satisfactory concert halls is represented by the crossed lines.

The degree of relative humidity $\phi$ which is to be attained by drying the air at a predetermined scale reduction factor $n$ can be determined by the formula $$k_M=\frac{2\pi}{M}\left[\left(\frac{0.04x}{T_O}-C'f_O^2\right)n-c'f_O^2n^2\right]$$

which formula is obtained from Equation 8, supra.

For air having a temperature of 20° centigrade and a pressure of one atmosphere we obtain the formula $$\phi'=\sqrt[1.3]{2.6k10^{-3}}$$

With a given degree of relative humidity and a given factor $n$, the accuracy (proportional to $1/x$) can be determined by the formula:

$$x=25T_O\left[c'f_O^2\left(n=\frac{C'}{c'}\right)+\frac{Mk_M}{2\pi n}\right]$$

which is also obtained from Equation 8, supra.

For a particular example of $t=20°$ centigrade and 60% relative humidity in the original, and completely dried air in the model $k_M=0$ we obtain $$c'=(33+0.2t)10^{-12}=3.7\ 10^{-11}$$

$$C'=\frac{2\pi M}{k}=2.6\ 10^{-10}$$

$$M=2\cdot10^{-7}t+8.3\ 10^{-6}=1.25\cdot10^{-5}$$

and Formula 9 is simplified:

$$n=7+11\frac{10^8x}{T_Of_O^2} \qquad (10)$$

This formula is shown as the diagram of FIGURE 4 with an error of $x=0.2$, i.e. 20%.

Figure 8:
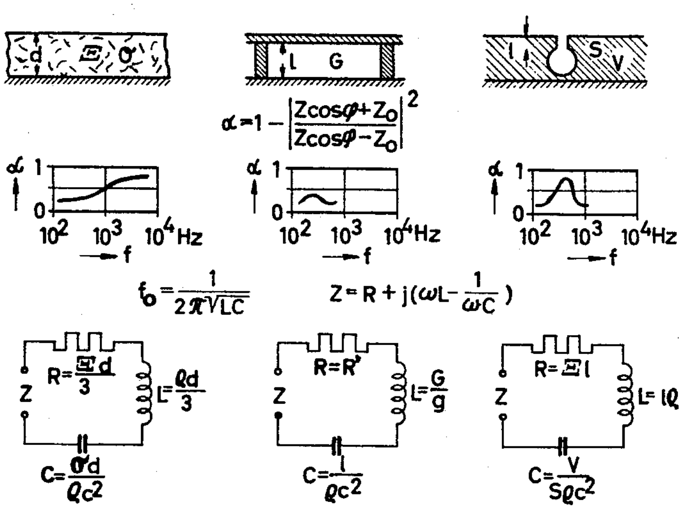
FIGURE 8 is a schematic view of various sound absorbing arrangements with their equivalent circuit diagrams, for use within the model space.

The walls of the model 10 must have a degree of sound absorption corresponding to that of the original room. This is done in the case of porous substances by reducing the linear dimensions of the original by the $n$-fold, by increasing the flow resistance $\Xi$ by the $n$-fold, leaving the porosity $o$ unchanged, and in case of resonant materials by decreasing the surface density G and the height of the air cushion $l$ by the $n$-fold. Various possibilities of sound absorbing arrangements are shown by way of an example in FIGURE 8, with the respective frequency curves and the respective equivalent circuit diagrams, and wherein there designate $d$ the thickness of the sound absorbing material, $\Xi$ the flow resistivity, $l$ the height of the air cushion, G the surface density of the wall portion, S the surface, V the volume, $\alpha$ the degree of sound absorption of a particular wall, Z the characteristic acoustical impedance, $\rho$ the density of the air, G the surface density of a wall. FIGURE 8 also indicates the formula with which the degree of sound absorption $\alpha$ can be computed from the mechanical data of the sound absorbing material. It is also possible to attain the desired frequency response characteristic by combining various deep-, middle- and high-pitch absorbing materials. The sound absorbing effect of porous substances can be changed by coating them with a varnish, thereby reducing their absorbing power. An empirical sound absorbing balance of the sound absorbing materials can be obtained in a small, highly reflecting model chamber according to the method of the German standard system DIN 52212.

Where medium sized rooms are tested an excessive gas absorption in the model can be compensated by reducing the absorption of the walls of the model. Thus, the absorption degrees $\alpha_M$ of the walls in the model are made somewhat smaller than the corresponding absorption degrees $\alpha_O$ of the original, according to the formula $$\bar{\alpha}_M=\bar{\alpha}_O-(m_M-nm_O)l_m$$

wherein $m_M$ is the exponent of sound attenuation of the gas meduim in the model; $m_O$ is the exponent of sound attenuation of the air in the original; both in Nepers per meter; and $$l_M=\frac{4V_M}{S_M}$$

is the so-called mean free path of a sound beam in meters, $V_M$ being the volume of the model in cubic meters, and $S_M$ being the surface area of the model in square meters.

This formula, giving the medium degree of absorption of the walls in the model, is obtained by the following calculations:

If in Formula 3, supra, $x$ is taken as 0, we obtain $$\frac{\Sigma\alpha_M S_M}{V_M}+4m_M=\frac{\Sigma\alpha_O S_M}{V_M}+4nm_M \qquad (11)$$

Instead of the sum of the single absorptions we now take a medium absorption:

$$\Sigma\alpha_M S_M=\alpha_M S_M \qquad (12)$$

and $$\Sigma\alpha_O S_M=\alpha_O S_M \qquad (13)$$

and thus we obtain $$\frac{\bar{\alpha}_M S_M}{V_M}+4m_M=\frac{\bar{\alpha}_O S_M}{V_M}+4nm_M \qquad (12)$$

wherefrom follows $$\bar{\alpha}_M=\bar{\alpha}_O-(m_M-nm_O)\frac{4V_M}{S_M} \qquad (14)$$

If $$\frac{4V_M}{S_M}=l_M$$

i.e. equal to the mean free path of a beam of sound, we obtain as the final result:

$$\bar{\alpha}_M=\bar{\alpha}_O-(m_M-nm_O)l_m \qquad (15)$$

In rooms with greatly differing dimensions as to length, depth and height, it will be of advantage to render the walls close to one another, i.e. with a smaller mean free path, less sound absorbing than the areas which are located at a greater distance from each other.

The basic features of the method of the invention will become even more apparent by the following example giving a chart of various scale reduction factors, the reverberation times for the original and for the model, the respective errors, the relative humidity, and the ratio between the volume of the model and the original. It is assumed that the original has a reverberation time of one second

| Scale reduction factor $n$ | Reverberation time in sec. Original $T_O$ | Model $n \cdot T_M$ | Error $x$ | Required relative humidity in percent | Size of model in % of original $\frac{V_M\ 1{,}000}{V_H}$ |
|---|---|---|---|---|---|
| 5 | 1.0 | 0.8 | 0.25 | 10 | 8 |
| Optimal range | | | | | |
| 7 | 1.0 | 0.825 | 0.2 | 9 | 3 |
| 10 | 1.0 | 0.85 | 0.17 | 5 | 1 |
| 12 | 1.0 | 0.85 | 0.195 | 2 | 0.58 |
| 20 | 1.0 | 0.68 | 0.47 | 0 | 0.125 |

It will be seen from this chart that for an admissible deviation of the reverberation time of 20% a scale reduction factor below 7, for example 5, will make the costs for constructing a model, which costs are approximately proportionate to the volume, unduly great.

In the optimal range with small degrees of relative humidity the differences of the reverberation time between the original and the model are sufficient. If the reduction factor becomes greater, for example 20, the building costs of the model are very small, however, the differences of the reverberation time between the model and the original are too great in spite of the fact that the air has been completely dried.

The optimal range has the advantage of the best compromise between the building costs and the necessity of having a model with a sound reproduction of sufficient fidelity and reasonable expense for drying the gas medium in the model. It can be seen from the chart that this optimal range is between $n=7$ and $n=14$.

Having thus described the method of my invention I shall next describe the apparatus of the invention for carrying out that method.

Figure 6:
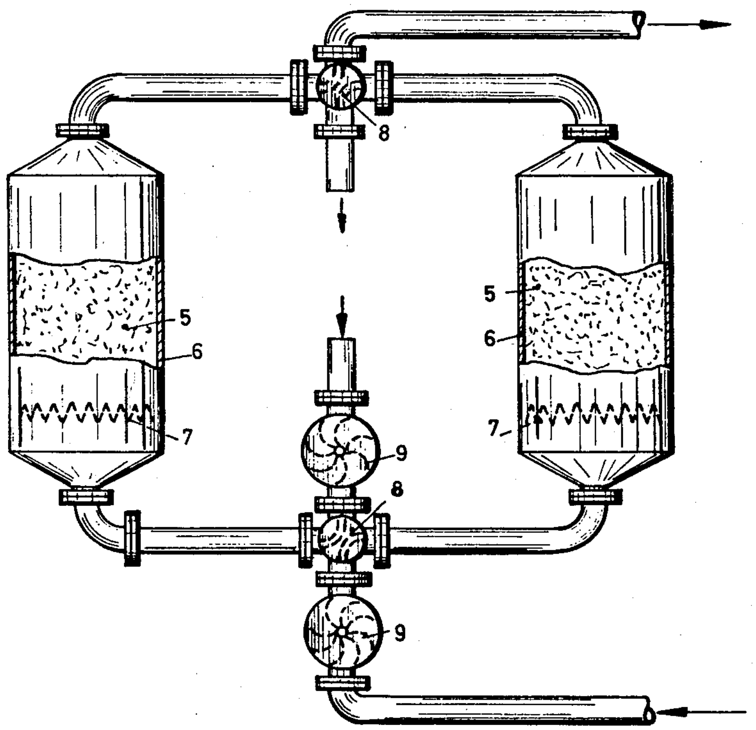
FIGURE 6 is a front view of a drying apparatus used in the invention.

As has been described further above it becomes necessary to dry the gas medium in the model down to a predetermined level of relative humidity below 10%. This can be done by means of liquified gases or hygroscopic chemical substances. According to a drying apparatus which can be advantageously used and which is shown in FIGURE 6 a hygroscopic chemical substance such as, for example, silicagel or activated aluminum oxide 5, is provided in a pair of containers 6 provided with heating coils and having associated therewith a pipe conduit system putting the two containers in mutual communication and in communication with the outside and having provided therein a pair of change cocks 8 and ventilators 9. The air to be dried is fed into one or the other of the exchangeably useable containers and is passed over the drying substance such as the silicagel, whereupon it leaves the pipe conduit system. The air is moved by the ventilators 9. The air contained in the model is passed through the drying apparatus until the required, predetermined relative humidity has been obtained.

The drying elements of this drying apparatus must have a certain minimum size in order to achieve a satisfactory drying within reasonable time. For about 1 cubic meter of air 2.5 kilograms of a drying substance such as silicagel will be required and a ventilator must be used, revolving the air approximately 100 times per hour.

The provision of two exchangeably useable dryers with the heating coil and the drying substance such as the silicagel has the advantage of enabling the continuous operation: While one dryer is in operation the hygroscopic substance in the other container 6 can be regenerated by the heating coil 7, and vice versa.

Figure 7:
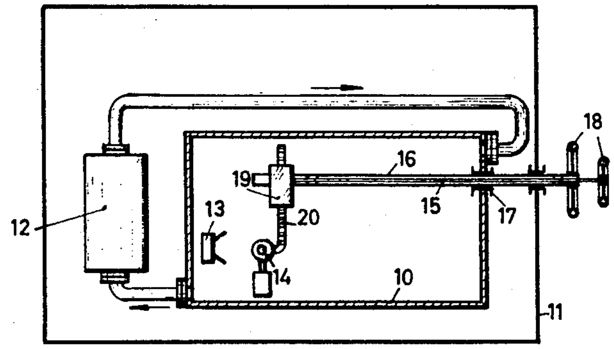
FIGURE 7 is a somewhat schematic view of the remote control means for adjusting elements within the model space.

The entire model has to be protected against humidity from the outside which is done as shown, for example, in FIGURE 7, wherein the model space 10 is entirely surrounded by a substantially air-tight foil 11 such as, for example, a plastic cover from, for instance, polyethylene. This plastic foil also covers entirely the drying apparatus 12 which is, for example, of the type shown in FIGURE 6. Within the model space 10 there are disposed the sound source 13 and the microphone 14.

In order to achieve the air-tight sealing of the model space 10 there are further provided remote control means for adjusting the sound source and the sound receiving member such as the microphone. For that purpose the microphone 14 is mounted on a rod 15 which latter is housed in a tube 16 leaving the space 10 through an air-tight bushing 17 and also leaving the air-tight cover 11 through further bushing 17a, and having at its outermost end hand wheels 18. At the opposite end, within the space 10, rod 15 bears a gear 19 and a toothed rod 20 connected with microphone 14. By turning the hand wheels 18 it is possible to adjust the microphone 14 via the rod 15, the gear 19 and the toothed rod 20.

Figure 9:
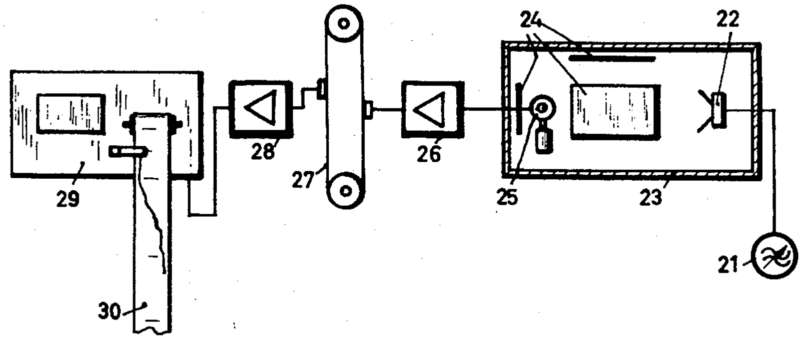
FIGURE 9 is a schematic view of an apparatus for recording the reverberation curves produced in the model reverberation chamber.

The apparatus of the invention further comprises means for producing sound and recording the sound effects in the model, as shown in FIGURE 9. The apparatus comprises a howler buzzer 21, and, disposed inside of the model reverberation chamber 23, a sound source 22 connected with the howler buzzer 21, as well as a microphone 25. Various samples of material 24 are also placed inside the space 23, which are to be tested for their sound absorbing qualities.

The microphone 25 is connected with a magnetic tape recorder 27 via amplifier 26, disposed outside of space 23. The tape recorder 27 is, in turn, connected with a logarithmic recording instrument 29, via amplifier 28, which recording instrument is equipped with the recording strip 30.

The howler buzzer 21 produces a diffused acoustic field via the sound source 22 in the model reverberation chamber 23. The sound effects after switching off the howler buzzer 21 are recorded via the microphone 25 and the amplifier 26 by the magnetic tape 27 running with the speed $v_M = nv_O$. Thereafter, the magnetic tape running with the speed $$v_O = \frac{1}{n} \cdot v_M$$

is scanned by a magnetic head and the voltage is fed, via the low frequency amplifier 28 into a logarithmic recording instrument 29, recording the reverberation on the recording strip 30.

The microphone and loudspeaker elements in the model must meet a number of requirements: they must be capable of transmitting the $n$-fold frequency of the original, they must have the same direction as the human ears, and they must be sufficiently sensitive that a sufficient amplitude range is obtained. These conditions are met by the microphone used according to the invention and shown in FIGURE 10*a*. The membrane 31 is formed by a plastic foil which is metallized and has a thickness of 6 microns. The membrane is tensioned by an etched counter-electrode 32 and a spring 33 mounted in an insulating body 34. The insulating body 35 secures the counter-electrode 32 against lateral displacement.

In order to have the same direction as the human ears, two microphones of the type shown in FIGURE 10*a* are assembled as shown in FIGURE 10*b*. The two microphones 36 and 37 are mounted in an artificial head 38, which has about $1/n$ of the size of a human head. The head 38 is mounted on a double amplifier 39 as a stator having $1/n$ of the linear dimensions of the human thorax. As has been explained above the sound source in the model has to produce only $1^2/n$ of the energy P in the original in order to have the same sound intensity, in view of the fact that the dimensions are $n^3$-fold smaller. With $n$-fold frequency the emitter amplitudes can be smaller by $1/n$. Preferably the counter electrode is spherically shaped forming half a sphere.

FIGURE 11 shows a di-electric high frequency loudspeaker with the counter electrode 40 over which there is tensioned the metallized, plastic membrane 41, electrode 40 having square shaped recesses 40*a* of a surface of 0.5 cm.$^2$, a depth of 50 microns, the membrane having a thickness of 6 microns, and being biased with 300 volts.

Microphone and loudspeaker also must have the equivalent direction as the natural sound sources in the original. This condition can be obtained by reducing the linear dimensions of microphone and loudspeaker by the $n$-fold, since the same diffraction effects occur due to the equivalent ratio of wave lengths and linear dimensions in the model and original. It is also possible to influence the direction by tubes, search tubes, acoustic lenses or the like. A search tube 42 is shown, for example, in FIGURE 12*a* which is coupled with the membrane 44 via a pressure chamber 43. FIGURE 12*b* shows an acoustic dispersing lens comprising an annular frame 71 supporting a plurality of shutter sheets 72, 73 of different length positioned inclined at similar angles and which is positioned in front of the microphone or loudspeaker.

The electric amplifying means must have a high amplitude range while eliminating linear and non-linear distortions. The amplifiers are therefore so constructed that they are capable of transmitting at least 100 kilocycles and have an amplitude range of 60 db. Noise and hum are suppressed by means known in the art such as negative feedback arrangements, matching and adjustment of level, frequency filters, shielding and twisting of the circuit wires, star connection symmetrical grounding etc. It is also possible to effect in a manner known in the art a balancing of the frequency band, for example by pre-emphasis and de-emphasis frequency response, in the process of sound recording or for the microphone and loudspeaker. In case of particularly great disturbance fields the entire model can be placed into a Faraday cage.

For the recording of the sound effects in the model a magnetic recording system with high bias frequency is preferably used and wherein the magnetic recording head is composed of iron with low losses such as ferrite, wherein all heads form one structure, wherein the air gap is so small that during the run-off movement of the tape the air gap width is not much greater than the wave length on the tape, and wherein the quality of that magnetic tape is so chosen that its demagnetizing effect is compensated by the pre-emphasis of the amplifier. 500 kilocycles are advantageously used as the erasure and bias frequency.

The recording arrangement is schematically shown in FIGURE 13 showing the emitter head 45 and the two stereophonic magnetic recording heads 46 and 47 composed of ferrite which recording heads record a sound track on the magnetic tape 48. The drive system is shown in FIGURE 14 comprising the electric motor 49 driving the belt and pulley systems 50 and 51 having a transmission ratio of $1:n$, the mechanical filter 52, a driving roll 53, a feed roll 55, and a deviating roll 56.

The electric motor 49 drives the belt and pulley systems 50 or 51, thereby obtaining a speed which is either 1 or the $n$-fold of speed 1. The motor then drives the mechanical filter 52 and the driving roll 53 and thereby the magnetic tape 54. The magnetic tape is obtained from a feed roll 55 and runs over the deviating roll 56. The mechanical filter prevents running fluctuation of more than 3%. The magnetic tape consists preferably of a perforated tape having a width of 35 mm. so that all sound effects can be recorded on the same tape.

The acoustic effects obtained in the model reverberation chamber can be made objective by measuring reverberation definition and diffusiveness of the sound energy in a manner known per se. Furthermore, the invention envisages to provide a spark sound producing device consisting of a spark gap 57 and a suitable voltage source 58 as shown in FIGURE 15. This can be used to ascertain disturbing reflection from the oscillographically recorded shock diagrams of fading sound effects.

The invention further envisages special arrangements for testing the acoustic quality of rooms where directly produced sound is heard in order to get a stereophonic appreciation of the sound quality. This is necessary in order to get an accurate and faithful appreciation of the sound effects of the original room just as they will be felt later on by the audience. For that purpose the electro-acoustic reception and recording means have a plurality of channels and the sound emission is made stereophonic by providing a channel with a loudspeaker, for example for each instrument group which is placed at the appropriate location of an orchestra in the model. The original recording will have to be made in a room which is free from reverberation effects or by effecting the recording with a plurality of microphones one of which is associated with each instrument and located at a distance $d$ which is smaller than the reverberation radius $r$. This precaution is necessary in order to get a true test of the reverberation effects in the model free from any reverberation effects of the recorded and emitted sounds. As shown in FIGURE 16 a speaker 59 talks into a microphone 60 at a distance $d$ which is smaller than the reverberation radius $$r = \frac{1}{10}\sqrt{\frac{V}{\pi T}}$$

if $r$ is measured in meters, the volume V in cubicmeters are the reverberation time T in seconds.

The invention further comprises means for balancing a plurality of channels of the stereophonic system. This is shown in FIGURE 17 and comprises the high frequency emitter 61, the electro-acoustic emitter 62 disposed within the anechoic chamber 63. Within the chamber 63 there is also disposed a stereophonic double microphone 64 which can be turned from the outside by wheels 65. The acoustic excitation is recorded on the magnetic tape 67 by the double magnetic recording heads 66 and is then at a speed of the tape reduced by the $n$-fold fed to the counter-poled earphones 69 via the audiofrequency amplifiers 68. The earphones 69 are balanced to a minimum which is done by turning the wheel 65 thereby shifting the phase and the amplitude, and via the potentiometers of the audiofrequency amplifiers 68 and the T-shaped tube section 70. The balancing is effected down to a difference of path of 1 cm. and a difference of intensity of 1 db particularly in the frequency range between 300 and 1000 cycles.

Preferably earphones are used which are electro-static or electro-dynamic, which are tuned to high frequency and which are equipped with a net-work for equalisation.

The testing of the sound effects in the model can also be made by a stereophonic loudspeaker arrangement with two channels, with the transmission and balancing procedures known as AB, XY, MS stereophonic systems. Attention must be paid that the room where the test is made does not have a reverberation since otherwise the reverberation effects of the model chamber will be disturbed.

It will be of advantage to employ a novel apparatus to practice the method of the invention, particularly the so-called re-iteration method by sending the distorted sound repeatedly through over the model. Thereby the sound effects can be better perceived by the observing person.

The method and apparatus of the invention can thus be used both for subjectively and for objectively predetermining the acoustic effects and qualities of rooms prior to their construction. It is, however, also applicable to study the relationship between objective measured values and subjective impressions of audibility, for studying the basic influence of particular structural arrangements used in architectonic design, and for generally ascertaining the optimal qualities of a room for particular purposes. Furthermore, problems can be solved in connection with sound absorbing materials and arrangements. It is also possible to add artificial reverberation to a recorded sound having little reverberation time, for example in case of play-back recordings. It is also possible to test electro-acoustical reinforcement systems by providing in the model reverberation chamber an electro-acoustical emitter and receiver system for $n$-fold acoustical frequencies without recording.

It will be understood that this invention is susceptible to modification in order to adapt it to different usages and conditions and, accordingly, it is desired to comprehend such modifications within this invention as may fall within the scope of the appended claims. AB systems operate with two microphones spaced from each other and both facing the sound source. XY systems operate with two microphones positioned close to each other, one having a horizontally positioned 8-shaped pickup characteristic. MS systems use one microphone with a kidney-shaped pickup characteristic and a second microphone, positioned close thereto and having a vertical 8 characteristic.

What I claim is:

1. A method for testing acoustic effects of a room comprising the steps of constructing a model on a scale reduced by the $n$-fold compared with the original room with the factor $n$ being selected from a range of 7 to 14, filling the model with a dried gas having a predetermined relative humidity, reproducing sound in the model at an $n$-fold increased frequency compared with the frequencies of sound in the original, and picking up said sound in said model.

2. A method for testing acoustic effects of a room comprising the steps of constructing a model on a scale reduced by the $n$-fold compared with the original room with the factor $n$ being selected from a range of 7 to 14, filling the model with a dried gas having a predetermined relative humidity of less than 10%, reproducing sound in the model at an $n$-fold increased frequency compared with the frequencies of sound in the original, and picking up said sound in said model.

3. A method for testing acoustic effects of a room comprising the steps of constructing a model on a scale reduced by the $n$-fold compared with the original room filling the model with a dried gas having a predetermined relative humidity, reproducing sound in the model at an $n$-fold increased frequency compared with the frequencies of sound in the original, with the factor $n$ being determined by the formula $$n=\frac{\frac{0.04X}{T_O}+C'f_O^2\pm\sqrt{\left(\frac{0.04X}{T_O}+C'f_O^2\right)^2-4C'f_O^2\frac{Mk_M}{2\pi}}}{2c'f_O^2}$$

and picking up said sound in said model, wherein $x$=error; $T_O$ time value;

$$c'=\frac{2\pi M}{k}$$

$k$=relative humidity; $f_O$=the upper marginal frequency; $c'$=speed of sound coefficient of the gas within the model room; $M=2\cdot10^{-7}t+8.3\cdot10^{-6}$; $t$=temperature; $k_M$=degree of relative humidity; $n$=the reduction factor and O-original room.

4. Method as described in claim 2, with the predetermined relative humidity of the air being determined by the formula $$k_M=\frac{2\pi}{M}\left[\left(\frac{0.04x}{T_O}-C'f_O^2\right)n-c'f_O^2n^2\right]$$

wherein $k_M$=degree of relative humidity, in model room; $M=2\cdot10^{-7}t+8.3\cdot10^{-6}$; $T_O$=time value; $f_O$=the upper marginal frequency; $n$=reduction factor; and $x$=error.

5. Method as described in claim 2 comprising the steps of circulating the air in the model over a hygroscopic, drying substance substantially 100 times per hour.

6. Method as described in claim 2 comprising the steps of circulating the air in the model over silica gel of a total amount determined by 2.5 kilograms of silica gel for each cubic meter of air in the model substantially 100 times per hour.

7. Method as described in claim 1, comprising the steps of recording a sound by placing the sound source at a distance from a microphone which is smaller than the reverberation radius, thereby obtaining a recorded sound free from reverberation, and said recorded sound being said sound reproduced in the model.

References Cited in the file of this patent

UNITED STATES PATENTS

| | | |
|---|---|---|
| 1,035,057 | Snare | Aug. 6, 1912 |
| 1,466,652 | Batter | Aug. 28, 1923 |
| 1,845,080 | Eyring et al. | Feb. 16, 1932 |
| 1,853,912 | MacNair | Apr. 12, 1932 |
| 2,017,153 | Kellogg | Oct. 15, 1935 |
| 2,318,417 | Phelps | May 4, 1943 |
| 2,502,018 | Olson | Mar. 28, 1950 |
| 2,863,953 | Reed et al. | Dec. 9, 1958 |
| 2,934,611 | Lindenberg | Apr. 26, 1960 |
| 2,973,107 | Cherel | Feb. 28, 1961 |
| 2,978,118 | Goertz et al. | Apr. 4, 1961 |
| 2,986,228 | Rettinger et al. | May 30, 1961 |

FOREIGN PATENTS

| | | |
|---|---|---|
| 470,752 | Canada | Jan. 9, 1951 |

OTHER REFERENCES

"Acoustics in Modern Building Practice," by Fritz Ingerslev, pub. 1952, pp. 36 and 81.